United States Patent
Chen et al.

(10) Patent No.: US 6,954,870 B2
(45) Date of Patent: *Oct. 11, 2005

(54) METHOD FOR RECEIVER DELAY DETECTION AND LATENCY MINIMIZATION FOR A SOURCE SYNCHRONOUS WAVE PIPELINED INTERFACE

(75) Inventors: Jonathan Y. Chen, Yorktown Heights, NY (US); Frank D. Ferraiolo, Essex Junction, VT (US); Kevin C. Gower, LaGrangeville, NY (US); Patrick J. Meaney, Poughkeepsie, NY (US); William J. Scarpero, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 667 days.

This patent is subject to a terminal disclaimer.

(21) Appl. No.: 10/096,382

(22) Filed: Mar. 12, 2002

(65) Prior Publication Data

US 2003/0188046 A1 Oct. 2, 2003

(51) Int. Cl.[7] .............................................. G06F 1/12
(52) U.S. Cl. ...................................................... 713/401
(58) Field of Search .......................................... 713/401

(56) References Cited

U.S. PATENT DOCUMENTS

| 5,838,936 | A | * | 11/1998 | Chau et al. ................. 713/600 |
| 5,938,180 | A | * | 8/1999 | Walsten .............. 254/134.3 FT |
| 6,334,163 | B1 | * | 12/2001 | Dreps et al. ................ 710/260 |
| 6,654,897 | B1 | * | 11/2003 | Dreps et al. ................ 713/401 |
| 6,766,464 | B2 | * | 7/2004 | Collier ....................... 713/503 |
| 2003/0188046 | A1 | * | 10/2003 | Chen et al. .................... 710/1 |

* cited by examiner

Primary Examiner—John R. Cottingham
(74) Attorney, Agent, or Firm—Lynn L. Augspurger

(57) ABSTRACT

A method of calibrating an elastic interface is provided to automatically achieve a minimal cycle delay through the interface. An existing self-alignment interface (i.e. elastic interface) is used to de-skew within a cycle and stage the data to have it arrive on a given, programmed target cycle. However, this target cycle must be calculated in advance and may be larger than it needs to be, causing more latency on the interface. This method is used to determine the earliest target cycle (with or without additional guard-band). This target cycle is used to adjust the interface automatically to achieve this earliest target cycle. The determination of earliest target cycle can be done once, continuously, or using a sample window. The method also can be used for interfaces that have frequency multipliers or phase shifts at its boundaries.

19 Claims, 3 Drawing Sheets

METHOD FOR RECEIVER DELAY DETECTION AND LATENCY MINIMIZATION FOR A SOURCE SYNCHRONOUS WAVE PIPELINED INTERFACE

FIELD OF THE INVENTION

This invention relates to computers and other digital systems, and particularly to a method for use in a digital system having a self aligning interface which enables the detection of delay for an synchronous wave-pipelined interface between two integrated circuits chips and the receiver chip which is automatically adjusted to minimize the latency.

RELATED APPLICATIONS

These co-pending applications and the present application are owned by one and the same assignee, International Business Machines Corporation of Armonk, N.Y.: U.S. patent application Ser. No. 09/263,662 entitled "Dynamic Wave Pipelined Interface Apparatus and Method Therefor".

The descriptions set forth in these co-pending applications are hereby incorporated into the present application by this reference.

Trademarks: z/900 and S/390 and IBM are trademarks of International Business Machines Corporation, Armonk, N.Y., U.S.A. Other names may be also be registered trademarks or product names of International Business Machines Corporation or other companies.

BACKGROUND

Within the receiver chip of the synchronous wave pipelined interface described in the U.S. patent application Ser. No. 09/263,662 entitled "Dynamic Wave Pipelined Interface Apparatus and Method Therefor", also known as the Elastic Interface having details described in U.S. Pat. No. 6,334,163 of Dec. 25, 2001 (entitled "Elastic Interface Apparatus and Method Therefor" and used for IBM's z/900 class systems, and other similar source-synchronous pipelined (bus-pumping) chip-to-chip interfaces, data is captured using the clock signals derived from the driver chip clock, which was sent to the receiver chip as the source clock signals in separate lines and then held in the receiver storage elements (typically FIFOs) for multiple cycles.

The data in the receiver storage elements must be transferred to the receiver chip's internal logic before they are overrun by the next incoming data. It is important to determine the time of transferring data to the receiver chip's internal logic in order to minimize the system latency. The time of transferring data out the receiver storage elements usually is related to the clock cycles that data are sent by the driver chip in synchronous systems. In the previous inventions, the clock cycle to transfer data (known as target cycle) was based on the analysis of the worst-case delays. The analysis-based target cycles must be conservative for the slowest hardware in order to meet the worst-case receiver setup time. Therefore, the target cycle setting usually adds extra latency and has a danger of violating the receiver hold time thus the data in the receiver storage elements being overrun by the succeeding data.

SUMMARY OF THE INVENTION

For digital systems having a self aligning interface the invention provides a method which enables the detection of delay for an synchronous wave-pipelined interface between two integrated circuits chips and the receiver chip which is automatically adjusted to minimize the latency.

Such a method includes the steps of a) aligning data using the self-aligning interface, b) sending a calibration pattern across said self-aligning interface, c) monitoring received data from said self-aligning interface, and d) calculating the earliest cycle the data word is available on said interface which is of the elastic interface type. Delaying the data after the step of monitoring data provides additional guard-band.

The delay detection and target cycle selection method described in this invention determines the earliest cycle that data can be transferred out the receiver storage elements during a detection phase. Then the target cycle is automatically set to the earliest possible cycle with minimum overall latency.

The advantages of this invention are:

Eliminated manual receiver target cycle settings;

Minimized the system latency;

Reduced potential receiver hold time problems of the early arrival data.

In particular, this invention solves the various target cycle setting problem for systems of multiple configurations with different delays. Due to the various delays and the fast cycle time of the high throughput interface, it becomes prohibitive and unreliable to set the receiver target cycle based on the analytical data.

These and other improvements are set forth in the following detailed description. For a better understanding of the invention with advantages and features, refer to the description and to the drawings.

Our detailed description explains the preferred embodiments of our invention, together with advantages and features, by way of example with reference to the drawings.

DETAILED DESCRIPTION OF THE INVENTION

Figure 1:
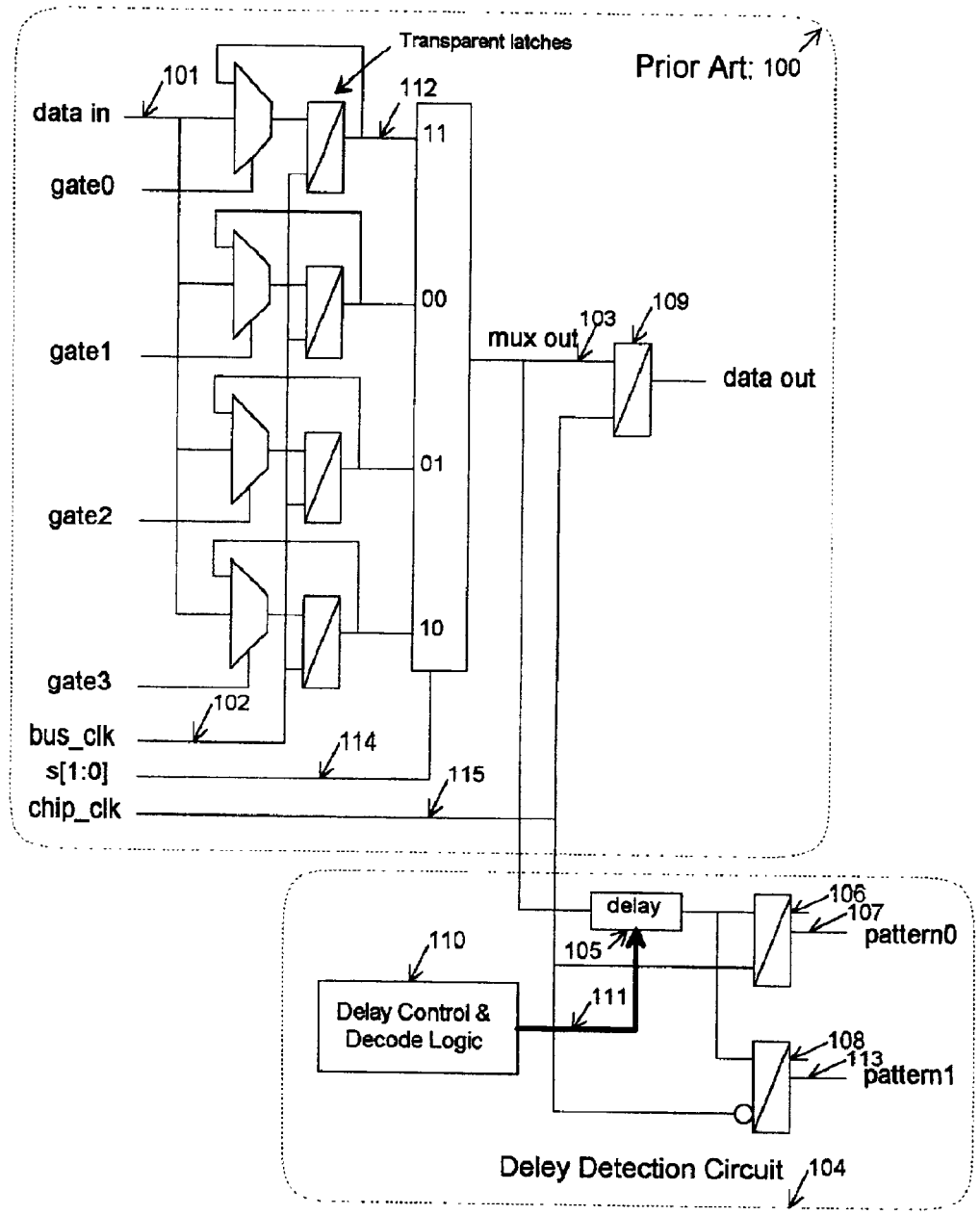
FIG. 1 illustrates the delay detection circuit added to one of the data bits of the Elastic interface receivers, which is enclosed by the dashed lines as the prior art.

The Synchronous Wave Pipelined interface (a.k.a. Elastic interface) receivers must be calibrated first. During the calibration, the driver chip sends an known alignment pattern and the data bits of the receiver chip are delayed by the digital delay lines (See U.S. Pat. No. 6,285,229 Sep. 04, 2001 "Digital Delay Line with Low Insertion Delay" for an example which is incorporated herein by this reference) to align them with the latest data bit. The differential bus clock from the driver chip is also delayed by another digital delay line to force it to be ½ of the bus clock pulse width later than the data bits. The prior art Elastic interface receiver circuit 100 (enclosed by the dashed lines) as shown by FIG. 1 is for one data bit. This receiver circuit is connected to the data bit digital delay line output signal data in 101. The delayed bus clock (bus_clk) 102 is derived from the output of the clock digital delay line. The receiver circuit 100 is identical for all the data bits of the interface bus. Therefore, the delay detection circuit (excluded from 100) as shown by FIG. 1 is only tapped into the mux out signal 103 of one of the Elastic interface receiver circuits.

Figure 3:
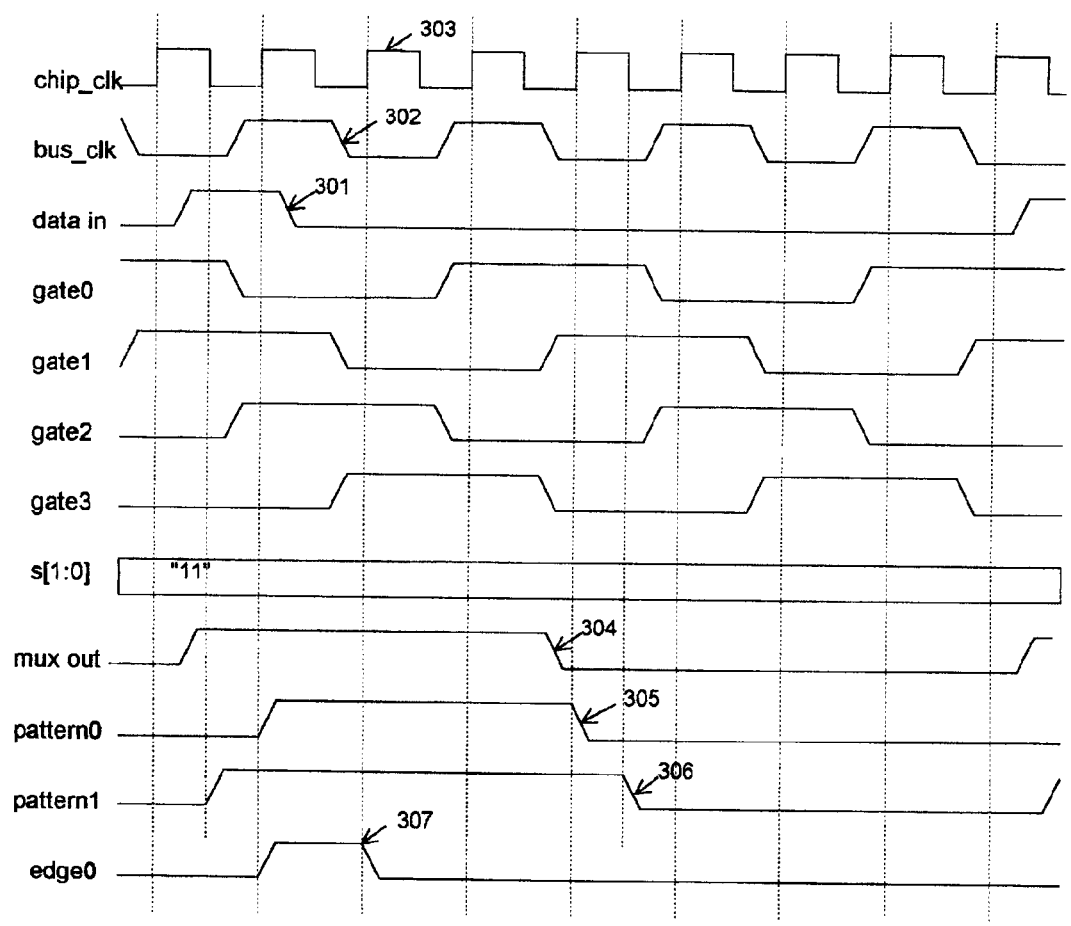
FIG. 3 is a timing diagram that illustrates the signal patterns of the named signals in FIG. 1 and FIG. 2.

Upon a successful Elastic interface calibration, a follow-on receiver delay detection phase is required. During the delay detection phase, the driver chip generates and sends an unique pattern or its variation, which is correlated to the Elastic interface alignment pattern, across the interface for receiver delay detection. In our implementation a known pattern (a repetitive "10000000" signal whose '1' pulse must be aligned with the logic '1' of the repetitive "1000" alignment pattern) is sent by the driver chip and appears at data in 101 of the receiver chip as the signal pattern 301 as shown by FIG. 3. The successful alignment ensures that the gate0 to gate3 signals are aligned with the data pattern as depicted by FIG. 3. The bus_clk 302 is ½ bus_clk pulse width later than the data in signal, and is asynchronous to the chip_clk 303 in FIG. 3.

The delay detection circuit 104 as shown in FIG. 1 has a programmable delay block 105 (implemented with the digital delay line with the delay step size of possibly smaller than one hundredth of the receiver chip clock period) to add extra delay to compensate for the delay differences due to random data, noise, as well as voltage and temperate fluctuations. The output of the delay block is fed to latch 106, which has output signal 107 named as pattern 0. There is an optional sampling latch 108 to double the detection precision. An alternative approach is to use the receiver latch 109 output directly for delay detection, but that requires adding one extra cycle to the detected arrival cycle as a safety margin (guard-band). The Delay Control & Decode Logic block 110 contains the register and the decode logic and sets the select signals 111 for the delay block 105.

The implementation show in FIG. 1 also requires forcing the 4-to-1 mux select signal 114 s[0:1] to "11" during the delay detection phase so that the mux out signal 103 is from signal 112 only. The additional logic that forces signal 114 is not shown here, which are simple logic OR gates with the Detection Mode Enable signal 205 shown in FIG. 2. An alternative implementation is to connect or couple the input of the programmable delay block 105 directly to signal 112, which does not have the effect of the 4-to-1 mux delay therefore compromised delay detection accuracy. The mux out signal has a known pattern shown as signal pattern 304, and is sampled by latch 106 and output as signal pattern 305 (named as pattern0) in FIG. 3.

Figure 2:
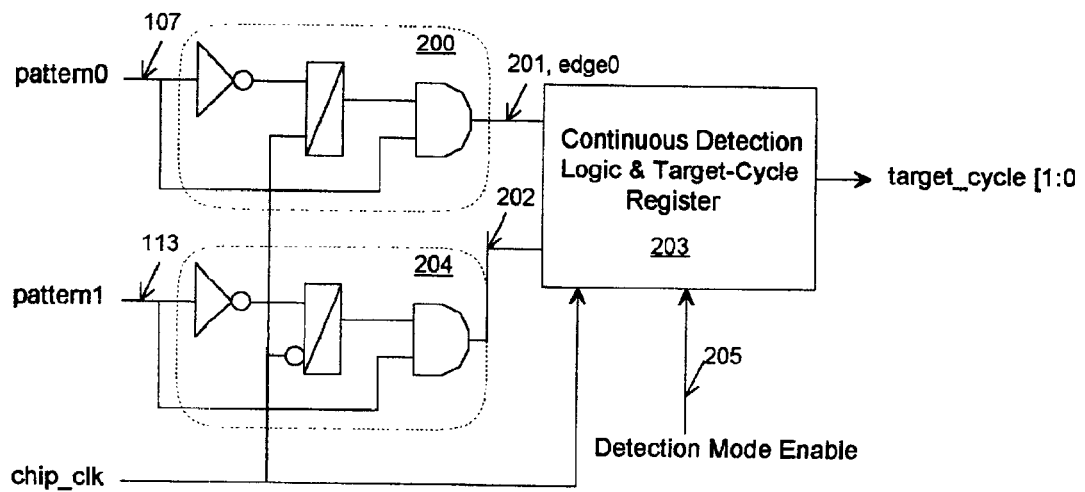
FIG. 2 illustrates a typical automatic target cycle selection circuit that results minimum latency.

FIG. 2 illustrates a typical implementation of the target cycle selection circuit that uses the delay detection circuit output 107 to determine the earliest receiving cycle with minimum latency. The edge detector 200 output edge0 signal 201 (shown as signal pattern 307 in FIG. 3) is an one cycle pulse that marks the earliest receiving cycle. A typical implementation of the edge detector 200 is comprised of an inverter, a latch or flip-flop, and an AND gate as shown in FIG. 2. The Continuous Detection Logic & Target Cycle Register block 203 in FIG. 2 allows monitoring the edge detector output signals 201 and 202 for many cycles and saves the worst-case receiving cycle as the target cycle to accommodate environmental factors. The Detection Mode Enable signal 205 controls the logic in 203 so that Block 203 is only active during the delay detection phase and it is inhibited during the normal operation. After the delay detection phase, the output of 203 (target cycle [0:1]) is used to shift the s[0:1] signals 114 to the chip_clk clock phase that results the minimum latency. The method of automatically use 203 as the target cycle of the receiver chip local clock (signal 115 in FIG. 1) can be either directly connected or coupled via hardware or software code.

The edge detector 204 is optional (with signal 113 of FIG. 1 as its input, and signal 113 is also shown as pattern 306 in FIG. 3). It is only needed for ½ chip_clk clock period detection accuracy. If the mux out signal 103 is more than ½ chip_clk clock period earlier than the chip_clk clock rising edge, then signal 202 is ½ chip_clk clock period earlier than signal 201. Otherwise, signal 202 is ½ chip_clk clock period later than signal 201. An alternative implementation is to compare pattern0 signal 107 and pattern1 signal 113 every chip_clk cycle instead of using the edge detectors 200 and 204.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a digital system having a self-aligning interface, the method of calibrating data comprising the steps of:
    a) aligning data using the self-aligning interface,
    b) sending a calibration pattern across said self-aligning interface,
    c) monitoring received data from said self-aligning interface, and
    d) calculating the earliest cycle a data word is available on said interface, and
    e) delaying the data, after said step of monitoring data, provides additional guard-band, and
    wherein a target cycle is selected which determines the earliest cycle that data can be transferred out of receiver storage elements during a detection phase and then the target cycle is automatically set to the earliest possible cycle with minimum overall latency and where said earliest cycle is the preferred target cycle.

2. The method of claim 1 wherein method includes a step of calculating self-alignment parameters to coincide with said preferred target cycle.

3. The method of claim 2 wherein method includes a step of reapplying said self-alignment parameters to the self-alignment design.

4. The method of claim 1 wherein method includes a step of using the preferred target cycle to stage the data independently of the said self-alignment design.

5. In a digital system having a self-aligning interface, the method of calibrating data comprising the steps of:
    a) aligning data using the self-aligning interface,
    b) sending a calibration Pattern across said self-aligning interface,
    c) monitoring received data from said self-aligning interface, and
    d) calculating the earliest cycle a data word is available on said interface, and
    e) calculating self-alignment parameters to coincide with said earliest cycle.

6. The method of claim 5 wherein said step of aligning data is accomplished with an alignment pattern.

7. The method of claim 6 wherein said calibration pattern is a function of said alignment pattern.

8. The method of claim 5 wherein said earliest cycle may be out of phase with the cycles used in the self-alignment interface.

9. The method of claim 1 wherein said step of delaying the data is accomplished using a delay line.

10. The method of claim 5 wherein method includes, prior to said step of monitoring the data, forcing self-alignment parameters to a fixed state.

11. The method of claim 5 wherein method includes, prior to said step of monitoring the data, a step of delaying the data to match part of the self-alignment interface delay.

12. The method of claim 3 wherein said step of reapplying said self-alignment parameters is done with hardware.

13. The method of claim 3 wherein said step of reapplying said self-alignment parameters is done with software code.

14. The method of claim 3 wherein said step of using the preferred target cycle to stage the data is done with hardware.

15. The method of claim 3 wherein said step of using the preferred target cycle to stage the data is done with software code.

16. The method of claim 5 wherein said step of calculating the earliest cycle the data word is done once.

17. The method of claim 5 wherein said step of calculating the earliest cycle the data word is done during a window of time.

18. The method of claim 5 wherein said step of calculating the earliest cycle the data word is done continuously and wherein a target cycle is selected which determines the earliest cycle that data can be transferred out the receiver storage elements during a detection phase and then the target cycle is automatically set to the earliest possible cycle with minimum overall latency and where said earliest cycle is the preferred target cycle.

19. The method of claim 1 wherein said self-aligning interface is an elastic interface.

* * * * *